United States Patent
Vincent et al.

[11] Patent Number: 6,146,571
[45] Date of Patent: Nov. 14, 2000

[54] METHOD OF MANUFACTURING A GOLF CLUB HEAD BY PLASTIC INJECTION USING INSERTS MELTABLE CORE, AND A GOLF CLUB HEAD MANUFACTURED BY THE METHOD

[75] Inventors: Benoit Vincent, Annecy le Vieux; Jean-Pierre Rigal, La Balme de Sillingy, both of France

[73] Assignee: Taylor Made Golf Co., Inc., Carlsbad, Calif.

[21] Appl. No.: 08/885,919

[22] Filed: Jun. 30, 1997

Related U.S. Application Data

[63] Continuation of application No. 08/392,725, filed as application No. PCT/FR93/00733, Mar. 17, 1995, abandoned.

[30] Foreign Application Priority Data

Sep. 18, 1992 [FR] France ................................. 92 11289

[51] Int. Cl.[7] .............................. B29C 33/52; B28B 7/34
[52] U.S. Cl. ................. 264/221; 264/317; 264/DIG. 44; 425/176; 425/DIG. 12
[58] Field of Search ................................. 264/221, 317, 264/DIG. 44; 425/176, DIG. 12

[56] References Cited

U.S. PATENT DOCUMENTS

| | | | |
|---|---|---|---|
| 3,692,306 | 9/1972 | Glover | 273/77 R |
| 3,843,122 | 10/1974 | Florian | 273/81 A |
| 3,989,861 | 11/1976 | Rasmussen | 427/180 |
| 4,076,254 | 2/1978 | Nygren | 273/173 |
| 4,313,607 | 2/1982 | Thompson | 273/167 H |
| 4,319,752 | 3/1982 | Thompson | 273/171 |
| 4,343,757 | 8/1982 | Popplewell | 264/221 |
| 4,438,931 | 3/1984 | Motomiya | 273/167 H |
| 4,451,041 | 5/1984 | Hayashi et al. | 264/261 |
| 4,464,324 | 8/1984 | Hager | 264/221 |
| 4,581,190 | 4/1986 | Nagamoto et al. | 273/167 H X |
| 4,614,627 | 9/1986 | Curtis et al. | 273/167 H X |
| 4,650,626 | 3/1987 | Kurokawa | 264/DIG. 44 |
| 4,730,830 | 3/1988 | Tilley et al. | 273/171 |
| 4,883,623 | 11/1989 | Nagamoto et al. | 264/317 |
| 4,930,781 | 6/1990 | Allen | 273/167 F |
| 4,988,104 | 1/1991 | Shoitani et al. | 273/167 H |
| 5,000,454 | 3/1991 | Soda | 273/167 H |
| 5,024,437 | 6/1991 | Anderson | 273/78 |
| 5,141,230 | 8/1992 | Antonious | 273/167 H |
| 5,166,247 | 11/1992 | Takatori et al. | 524/377 |
| 5,262,118 | 11/1993 | Fukushima et al. | 264/317 |
| 5,306,450 | 4/1994 | Okumoto et al. | 264/259 |
| 5,614,143 | 3/1997 | Hager | 264/221 |

FOREIGN PATENT DOCUMENTS

| | | |
|---|---|---|
| 0470488 | 2/1988 | European Pat. Off. . |
| 0433000 | 6/1991 | European Pat. Off. . |
| 61-33973 | 10/1986 | Japan . |
| 4-189373 | 7/1992 | Japan . |
| 2128539 | 5/1984 | United Kingdom . |
| 2173146 | 10/1986 | United Kingdom . |
| 2173407 | 10/1986 | United Kingdom . |

*Primary Examiner*—Catherine Timm
*Assistant Examiner*—Suzanne E. Mason
*Attorney, Agent, or Firm*—Greenblum & Bernstein, P.L.C.

[57] ABSTRACT

A method of manufacturing a golf club head that includes a peripheral shell constituted by an assembly of walls obtained by injecting a plastic material forming an inner cavity enclosing at least one inner insert kept immobilized by a partial plastic material coating of the shell. Prior to the injection step of the shell, an assembly is placed and immobilized in the mold which is comprised of a meltable core made of a second material having a melting point that is lower than the melting point of the plastic material in the space left free between the walls of the mold and the assembly, so as to coat the meltable core and all or a part of the free portion of the insert. Finally, all or a portion of the meltable core is eliminated to enable an inner volume to be freed so as to form the inner cavity.

31 Claims, 10 Drawing Sheets

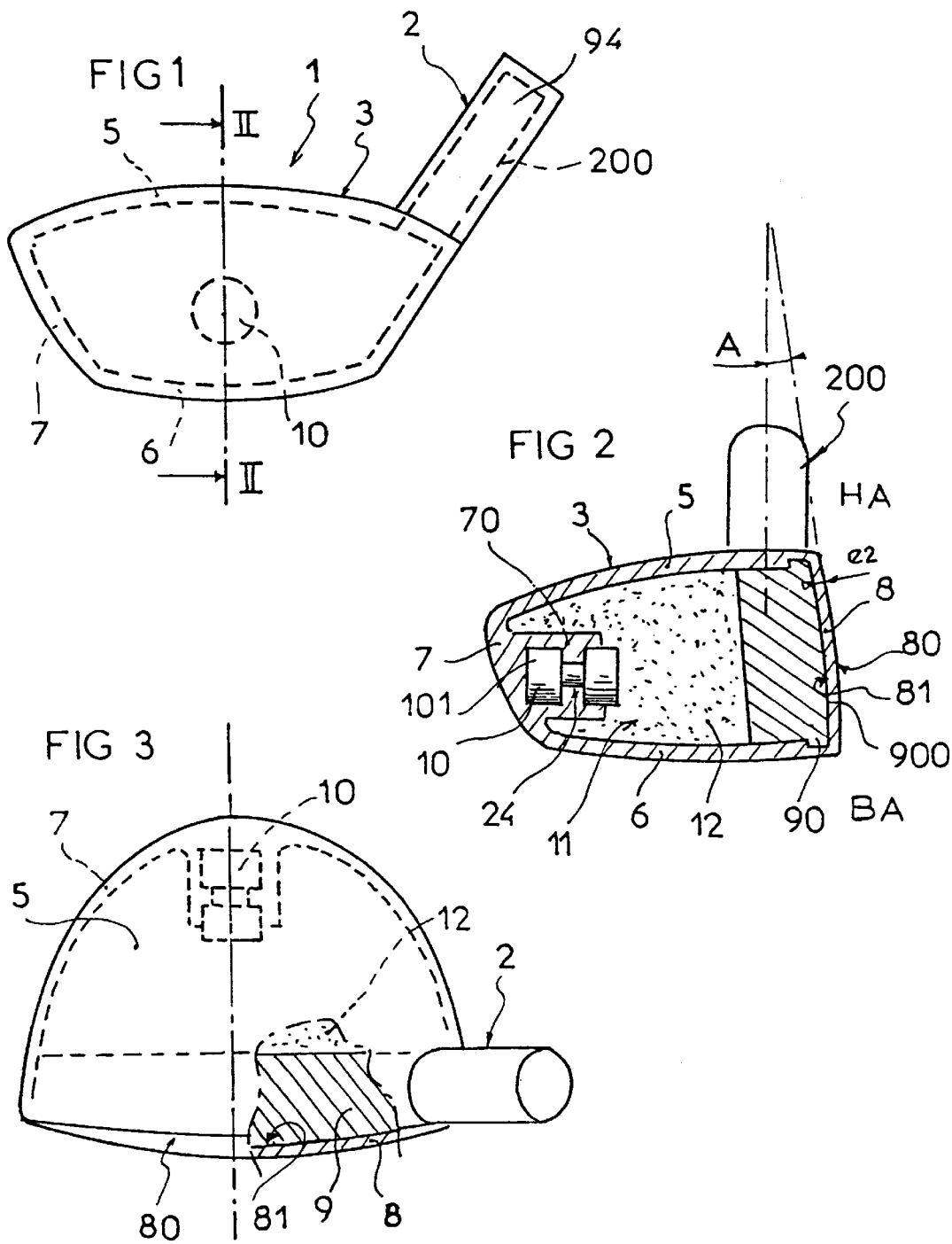

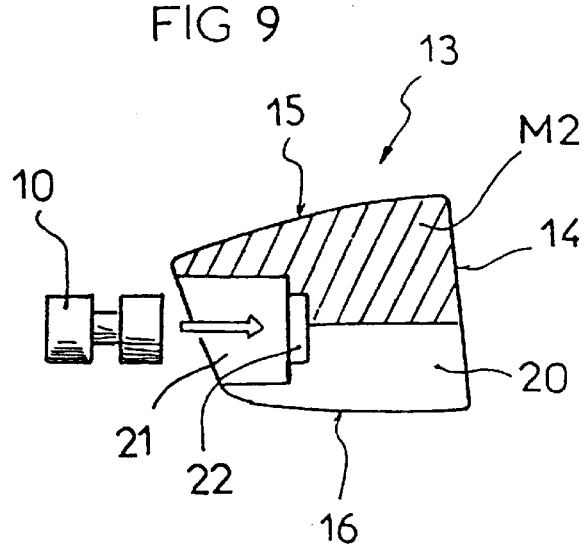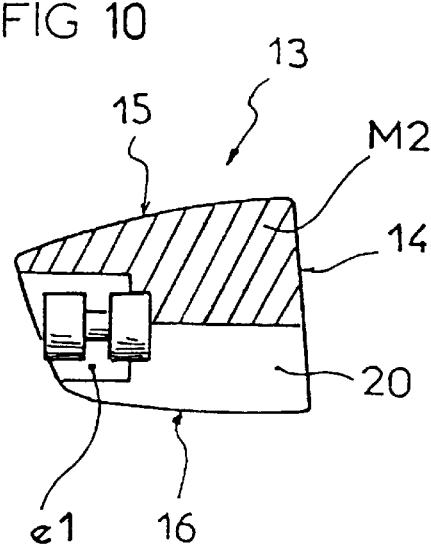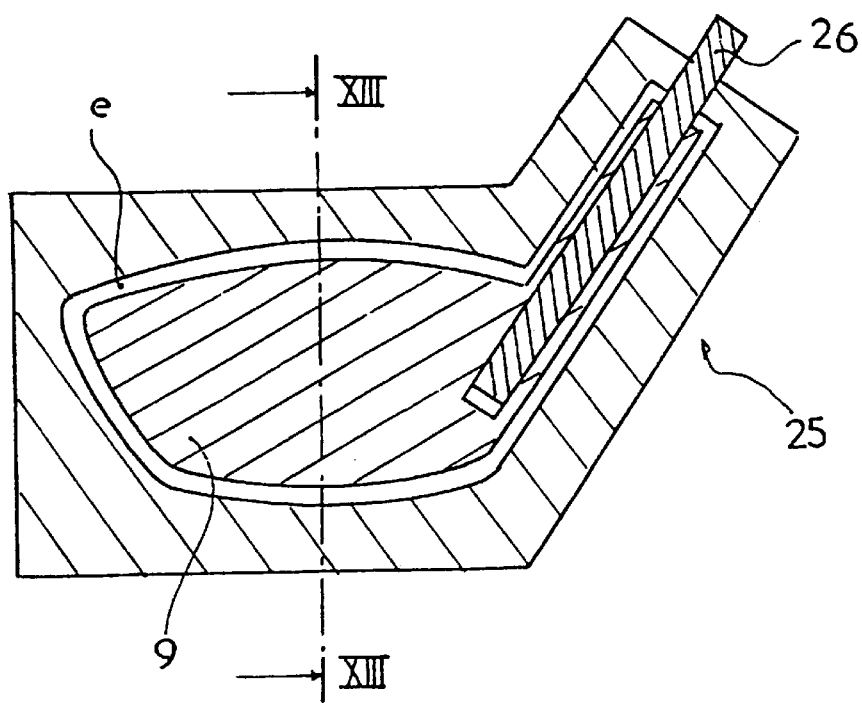

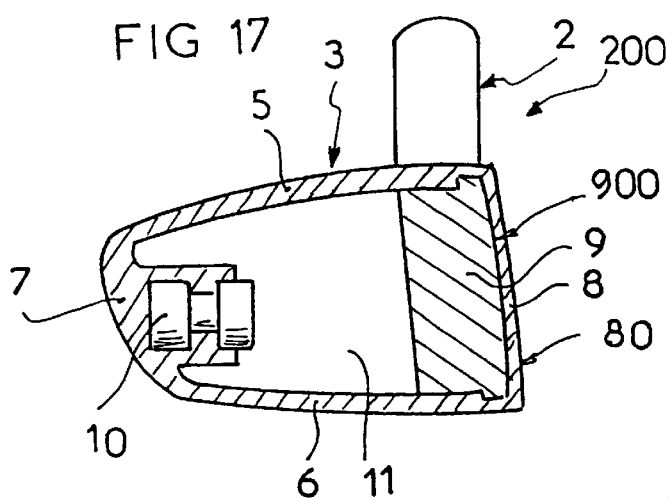
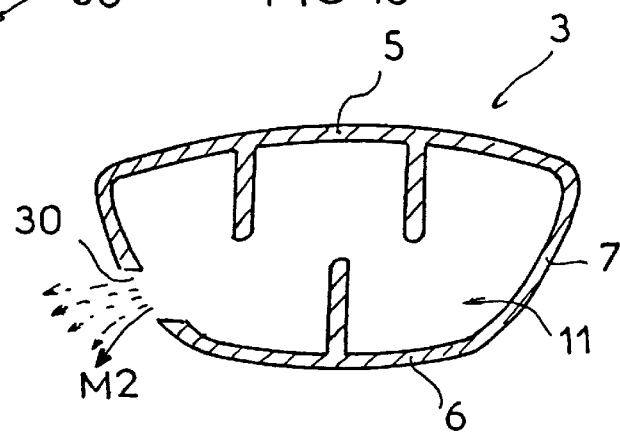
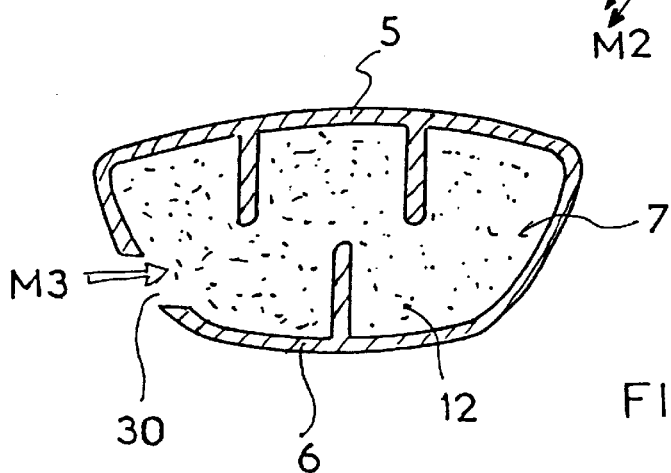
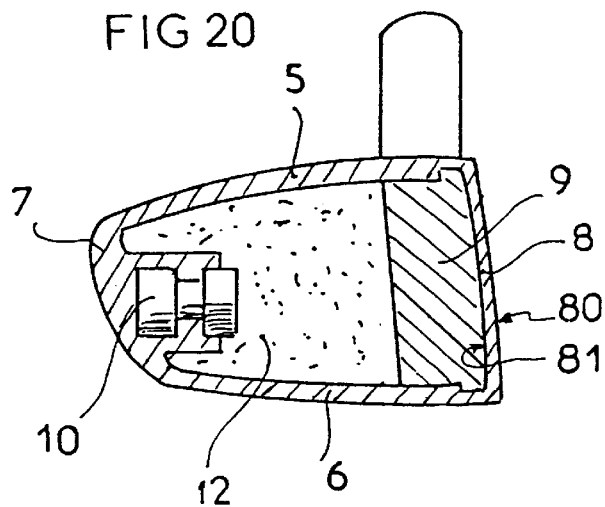

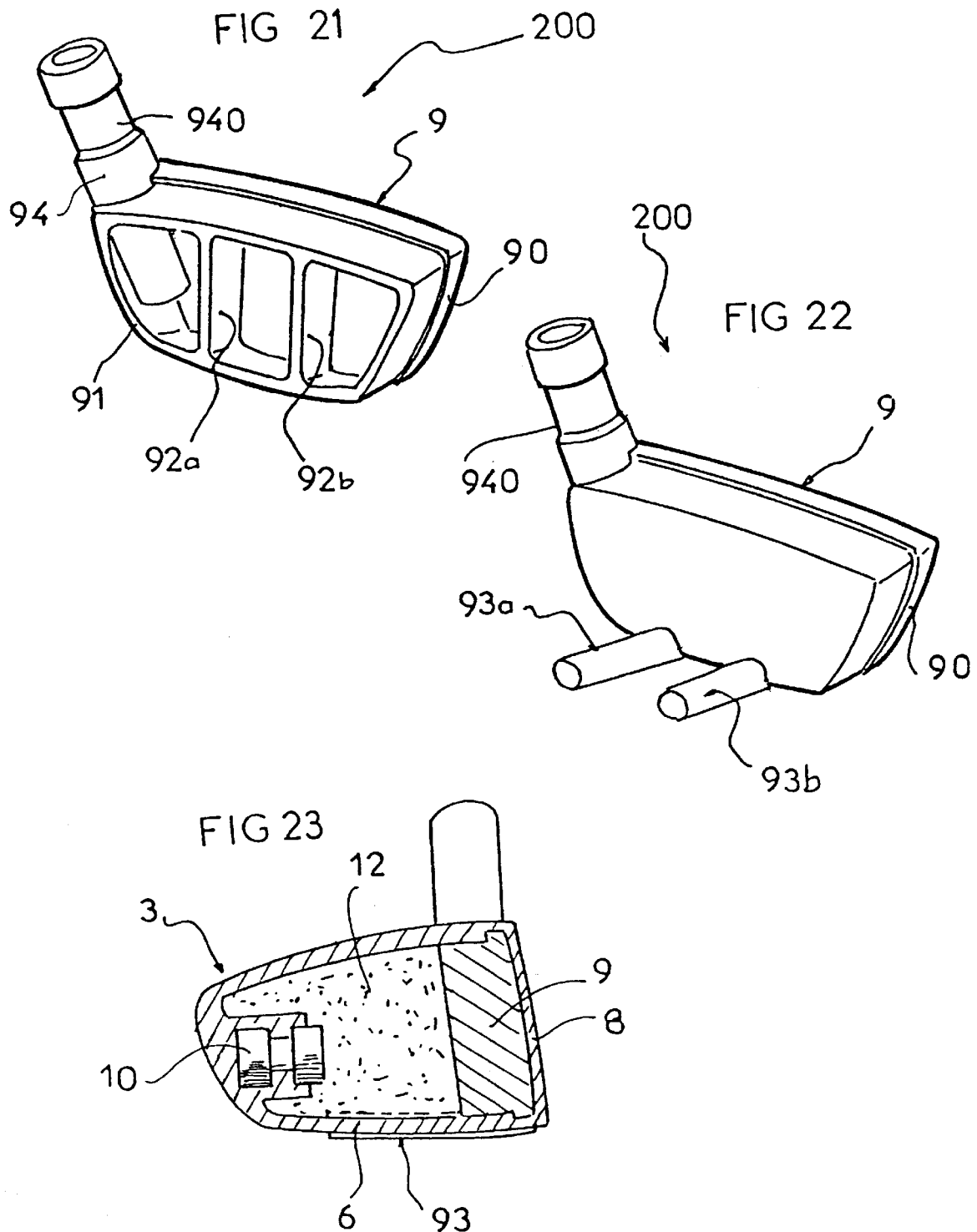

METHOD OF MANUFACTURING A GOLF CLUB HEAD BY PLASTIC INJECTION USING INSERTS MELTABLE CORE, AND A GOLF CLUB HEAD MANUFACTURED BY THE METHOD

This application is a continuation of application Ser. No. 08/392,725, filed Mar. 17, 1993, now abandoned, which is the U.S. national stage of international application No. PCT/FR93/00733, filed on Jul. 20, 1993.

BACKGROUND OF THE INVENTION

1. Field of the Invention

The present invention relates to a method of manufacturing an improved golf club head and the improved golf club head thus manufactured.

2. Description of Background and Relevant Information

In the sport of golf, the player propels his or her ball by striking it with a golf club which is constituted by a handle or shaft, which comprises a head at its lower end, whereas its upper end is equipped with a handgrip or grip.

In order to play golf, the player has a certain number of clubs, all of which are different with respect to one another and which generally fall under three categories, viz., woods, irons and putters.

At this time, the clubs used by golfers from the tee at the start of a hole, i.e., the club used for carrying the ball over long distances, are "woods". Each manufacturer gives his products, including the woods in a line of golf clubs, a specific structure, while complying with a certain number of rules that are necessary to standardize such golf clubs in competitions. As such, certain dimensions, inclinations and masses are regulated, whereas a large number of other parameters are completely unregulated, resulting in a large diversity in products having different designs. While playing, players use other clubs, i.e., "irons", that are subject to the same types of rules.

The precision of a golf shot depends upon a certain number of parameters, particularly human parameters, but also parameters connected to the construction of the club itself, and especially the distribution of mass and the club structure. Movement of the club before striking the ball can be more or less precise and the position of the golf club head during impact can be more or less good with respect to the ball. Golfers are very well aware of the fact that the smallest imprecision at the moment of striking the ball will have significant consequences. In fact, at the moment of impact, the point of impact of the ball on the striking surface of the club head should be perfectly perpendicular, joining the center of gravity of the ball and the center of gravity of the golf club head. If this condition is not adhered to during impact, the club head, under the effect of the impact, will pivot and the striking surface will open or close and the path of the ball will not be the one desired. If the striking surface opens substantially, the ball will go to the right and if the striking surface closes, the ball will go the left. Current club heads demonstrate very little tolerance in this regard and it becomes necessary to hit the ball with a great deal of precision.

Golf clubs used on the tee or otherwise for great distances typically comprise a metallic head, have a fine thickness, are hollow and are constituted by the assembly of several metal elements welded to one another and defining an inner closed cavity. Such constructions, described in U.S. Pat. Nos. 4,438,931 and 5,024,437 and Japanese Patent Publication No. 61-33973, are such that the clubs thus constructed have a tolerance that cannot be improved beyond a certain threshold due to the critical mass of the head and due to the isotropic nature of the material. In fact, no addition of weights is generally possible without exceeding the mass limits beyond which the club can no longer be balanced correctly and the distribution of mass is closely linked to the shape of the head itself. Another disadvantage of this type of head is related to the nature of the material of the impact surface which, although it allows a direct transmission of information to the player, also conversely gives rise to disagreeable sound and sensation at impact.

For some years now, heads made entirely of a composite material, with the exception of the sole, have been manufactured. Such types of constructions are rarely favored by professional players, because they are, most often, made of a single element, by the compression molding method, without any particular regard to the distribution of mass. In addition, such constructions do not offer a positive sensation to the player at impact due to the substantial graphite thickness of the front wall, which is necessary to ensure resistance.

A head made of a plastic material is disclosed in British Patent Publication No. 2,128,539. This head is made of a single thermoplastic element injected into a mold around a meltable core. The head thus manufactured does not allow a good control over the trajectory of the balls because the problem of balancing the club is not resolved.

U.S. Pat. No. 5,000,454 discloses a head made of a reinforced plastic material and comprises an element acting both as the reinforcement of the striking face and as the balancing weight. However, such a structure does not yet permit the club to be balanced satisfactorily.

SUMMARY OF THE INVENTION

It is an object of the present invention to overcome the disadvantages inherent to the traditional structure of club heads, and to provide a new head design as well as a new method of manufacturing such head.

Thus, one of the more specific objects of the invention is to provide a manufacturing method enabling a more efficient new head structure to be obtained, especially as regards distribution of mass, durability, and finishing quality. The method according to the invention is particularly adapted to the large scale production of elements requiring a minimum number of operations.

Thus, according to the invention, the manufacturing method of a golf club head includes a peripheral shell composed of an assembly of walls obtained by injecting a plastic material forming an inner cavity enclosing at least one insert, kept immobilized by a partial plastic material coating of the shell, wherein prior to the injection step of the shell, an assembly comprising a meltable core made of a second material having a lower melting point than the melting point of the plastic material is arranged and immobilized in a mold, and the insert is affixed to the meltable core. Thereafter, the plastic material is injected in the space left free between the walls of the mold and the assembly such that the meltable core and all or a part of the free portion of the insert are coated. Finally, all or a part of the meltable core is eliminated so as to free an inner volume in order to form the inner cavity.

According to a complementary characteristic, the free portion of the insert has a shoulder or a projection enabling the insert to become affixed by the injected plastic material of the shell.

According to one aspect of the invention, the insert is a resistance element comprising a resistance wall affixed to the front face of the meltable core before the injection operation so as to mainly reinforce the front wall of the shell, after the injection operation.

According to another aspect of the invention, the insert is a local weight affixed to one of the faces of the meltable core before the injection operation, so as to become affixed to one of the walls of the shell after the injection operation.

According to a secondary aspect of the invention, the meltable core includes at least one housing in which the weight is retained, the housing having greater dimensions than those of the weight at least at some places, such that there is a space between the weight and the walls of the housing, such space being adapted to be filled by the first plastic material during the injection step.

According to an additional aspect of the invention, in a complementary step, a low density filler material is poured in the inner cavity left free.

According to other aspects of the method, in a preliminary phase, a resistance element is obtained which is placed in the mold before the injection step. The element is metallic or is made of a resin, reinforced for example, with glass fiber or other material.

According to another aspect of the invention, the meltable core is, for example, made of a tin, lead, and bismuth alloy, whereas the shell is made of a material that can be obtained by injection, such as polyamide, polypropylene or ABS (acrylonitrilebutadienestyrene) reinforced or not with carbon or glass fibers.

The invention is also directed to a golf club head, preferably of the wood type, including a peripheral shell and a neck extending laterally, wherein the shell is formed by an assembly of walls made of a low modulus injected plastic material. The assembly includes an upper wall, a lower wall, a peripheral wall, and a front wall forming the striking surface of the head, the inner face of the front wall being in support on the front face of an inner resistance wall made of a high modulus material.

According to complementary characteristics of the invention, the resistance wall is a portion of a resistance element that extends laterally by a tubular portion forming at least partially the neck of the head.

According to a preferred arrangement, the shell is formed by an assembly of walls, including an upper wall, a lower wall, a peripheral wall, and a front wall forming the striking surface of the head. The inner face of the front wall is in support on the front face of the inner resistance wall.

According to another complementary characteristic, the inertial weight made of a high density material is retained in the inner cavity by one of the walls, and especially by the peripheral wall that comprises a retention projection at least partially enveloping the weight.

BRIEF DESCRIPTION OF THE DRAWINGS

Other characteristics and advantages of the invention will become apparent from the description that follows with respect to the annexed drawings that are provided only as non-limiting examples thereof.

FIGS. 1 through 4 illustrate the golf club head according to the invention, wherein:

FIG. 1 is a front elevation view of the head;

FIG. 2 is a side elevation view in section, taken along line II—II of FIG. 1;

FIG. 3 is a top plan view in partial section; and

FIG. 4 is a perspective view;

FIGS. 5 through 20 illustrate the manufacturing method according to the invention, wherein:

FIGS. 5, 6, 7, and 8 represent a preliminary phase that consists of obtaining a meltable insert, wherein:

FIG. 5 is a front elevation view;

FIG. 6 is a side elevation view in section taken along line VI—VI of FIG. 5; and FIGS. 7 and 8 respectively illustrate front and rear perspective views;

FIGS. 9 and 10 are schematic side elevation views, schematically illustrating an intermediate step;

FIG. 11 is a perspective view, representing another preliminary phase;

FIGS. 12, 13, and 14 illustrate the actual injection step, wherein:

FIG. 12 is a sectional view taken along line XII—XII of FIG. 13;

FIG. 13 is a sectional view taken along line XIII—XIII of FIG. 12; and

FIG. 14 is a sectional view taken along line XIV—XIV of FIG. 13;

FIGS. 15 and 16 illustrate a first complementary step;

FIGS. 17 and 18 illustrate a second complementary step; and

FIGS. 19 and 20 represent a third complementary step of the foam injection;

FIGS. 21, 22, and 23 illustrate two variations of the resistance element, wherein:

FIG. 21 is a rear perspective view of a first variation; and

FIGS. 22 and 23 illustrate a second variation, FIG. 22 being a view similar to FIG. 21, whereas FIG. 23 is a view similar to FIG. 2;

DETAILED DESCRIPTION OF THE PREFERRED EMBODIMENTS

Figure 4:
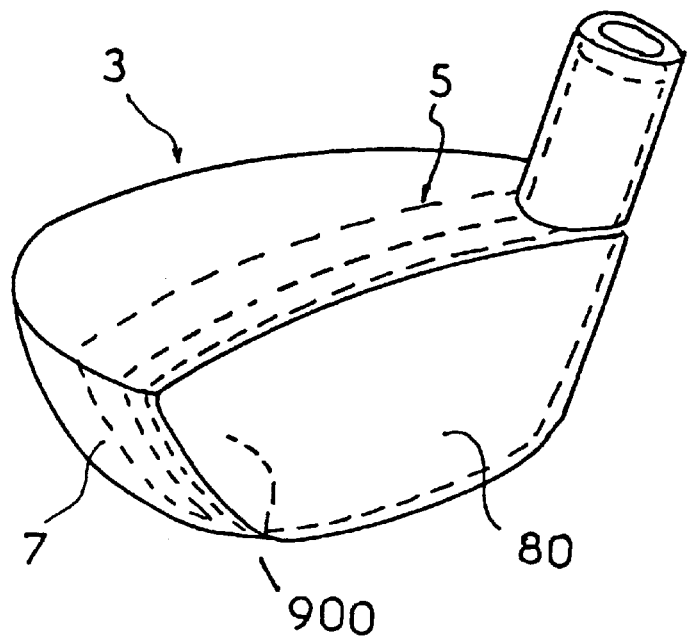

FIGS. 1 through 3 represent a golf club head manufactured according to the method of the invention. The head is of the wood type and it comprises an actual head body 1 extended laterally and upwardly by a neck 2 adapted to receive, in a known manner, the club shaft (not represented). The body of the actual head is constituted by a shell 3 formed by an assembly of walls having fine thicknesses comprised between 2 and 5 mm. The assembly includes an upper wall 5, a lower wall 6, a peripheral wall 7, and a front wall 8 whose front face 80 constitutes the striking surface adapted to hit the ball during the shot. Moreover, the inner face 81 of the front wall 8 is in support on the front face 900 of the resistance wall 9. According to the invention as illustrated, the shell 3 is made of a plastic material, reinforced or otherwise, of the injected thermoplastic type, such as polyamide, polypropylene or ABS (acrylonitrilebutadienestyrene). Shell 3, forming an outer peripheral envelope and constituting an inner closed cavity 11, is advantageously filled with a filler material 12, such as a low density foam and, for example, a polyurethane foam.

Further, the head includes a resistance element 200, for example, made of high-strength aluminum, constituted by the resistance wall 9 and by a lateral tubular portion 94, preferably made of steel, and attached on the side of wall 9. This tubular portion at least partially constitutes the rigid structure of the neck 2 on which the club shaft is adapted to be force-fitted. The resistance wall 9 has the overall shape of the striking surface and comprises a peripheral shoulder or edge 90.

According to an advantageous arrangement, the rear portion of the actual head includes an inertial weight 10 super-molded in the material 70 constituting the rear peripheral wall 7. The weight 10 has the general shape of a cylindrical element comprising a throat or recess 24 and is made of a material having substantial density, such as brass, bronze, steel, or other material.

The invention is directed to the method for producing the head such as described previously, such method comprising various successive phases. Thus, in a preliminary step, a core 13 (see FIGS. 5, 6, 7, 8) is made of a material M2 having a low melting point and comprises, for example, a metallic core made of, for example, a tin, lead and bismuth alloy. The core 13 is produced, for example, by molding and has the general shape of the inner cavity 11. Thus, the core includes a front face 14, an upper face 15, a lower face 16, and a lateral peripheral face 17. It advantageously comprises three longitudinal vertical recesses 18, 19, 20 and, according to a complementary characteristic, a rear housing 21 extended by a retention hole 22 adapted to retain a weight 10 having, for example, a general cylindrical shape, and made of a high density material such as brass or bronze. It must be noted that the housing 21 has dimensions, especially diametrical dimensions, that are greater than those of the weight 10 so as to create a space el (see FIG. 10) between the walls of the housing and those of the weight. This space e1 is adapted to become filled with material during injection of the shell, as is explained below.

Figure 27:
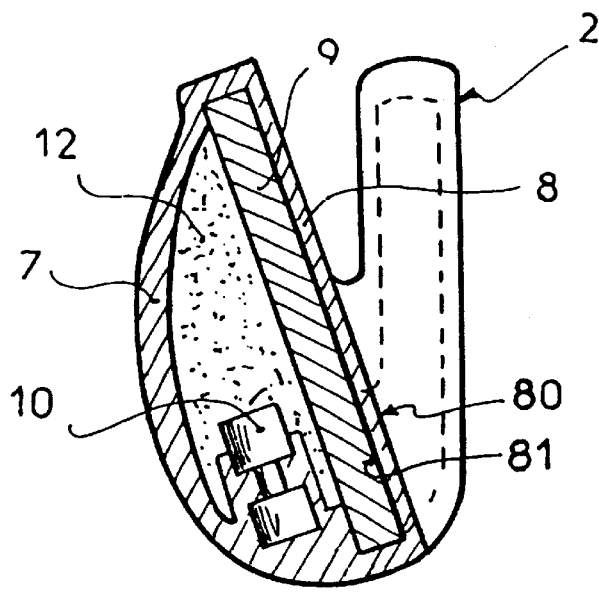
FIG. 27 is a view similar to FIG. 2, illustrating another type of head according to the invention.

In an intermediate step, the weight is engaged in the rear housing 21 (see FIG. 8) and is retained there by means of the retention hole 22 (see FIG. 9). However, the weight could be positioned at another place and, as represented in FIG. 27, it could be positioned and inserted from a lower portion of the club head.

Figure 11:
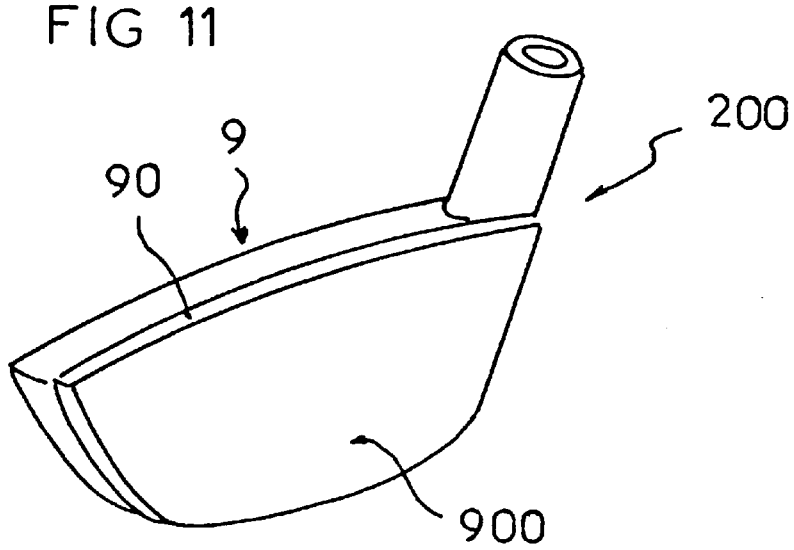
Figure 5:
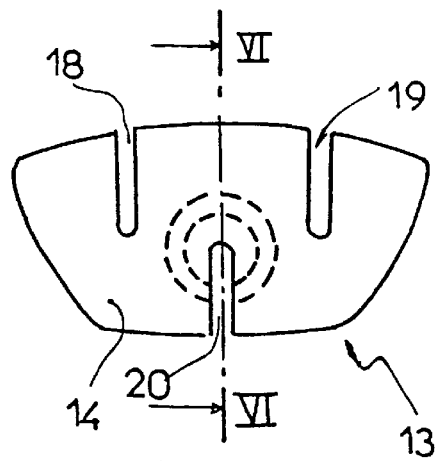
Figure 6:
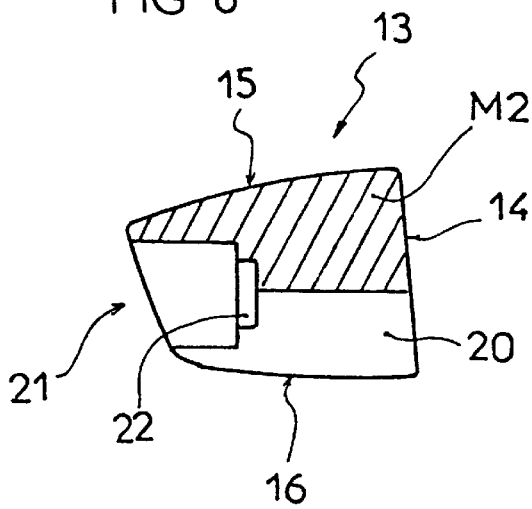
Figure 7:
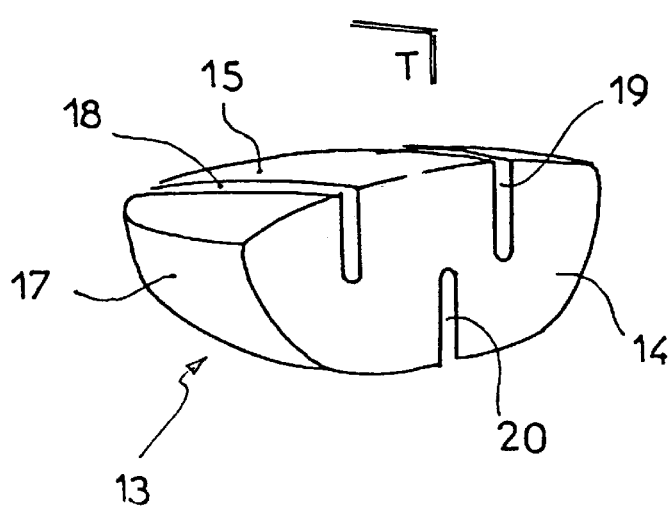
Figure 8:
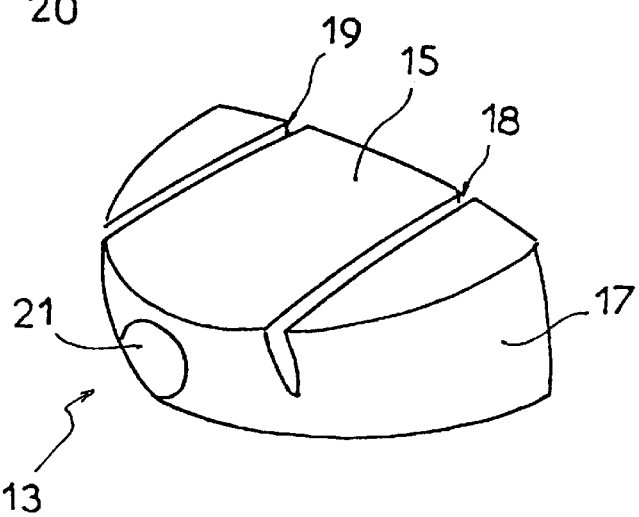

In another preliminary step (see FIG. 11), the resistance wall 9 of element 200 is made, for example, by aluminum molding. The resistance wall 9 has a front face 900 and a peripheral edge 90. The thickness of the resistance wall 9 can be, for example, from 4 to 6 mm. It can be provided with inner reinforcement ribs, as is represented in FIG. 21. The wall can be made of any other appropriate material, such as a composite material. Preferably, the resistance element comprises a tubular portion 94 made of steel which is attached and welded to or sunk in wall 9. In addition, this portion comprises a neck 940 (see FIG. 21), facilitating the manipulation of the tubular portion so as to easily adjust the "lie" or "loft" angle of the head.

Figure 13:
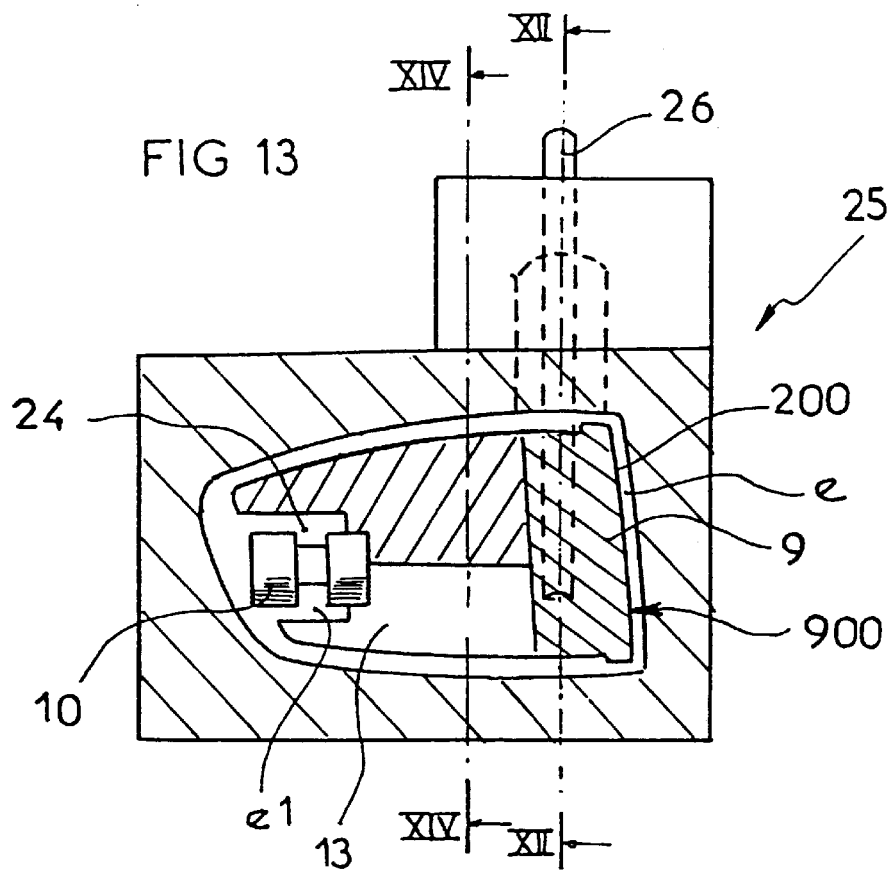
Figure 14:
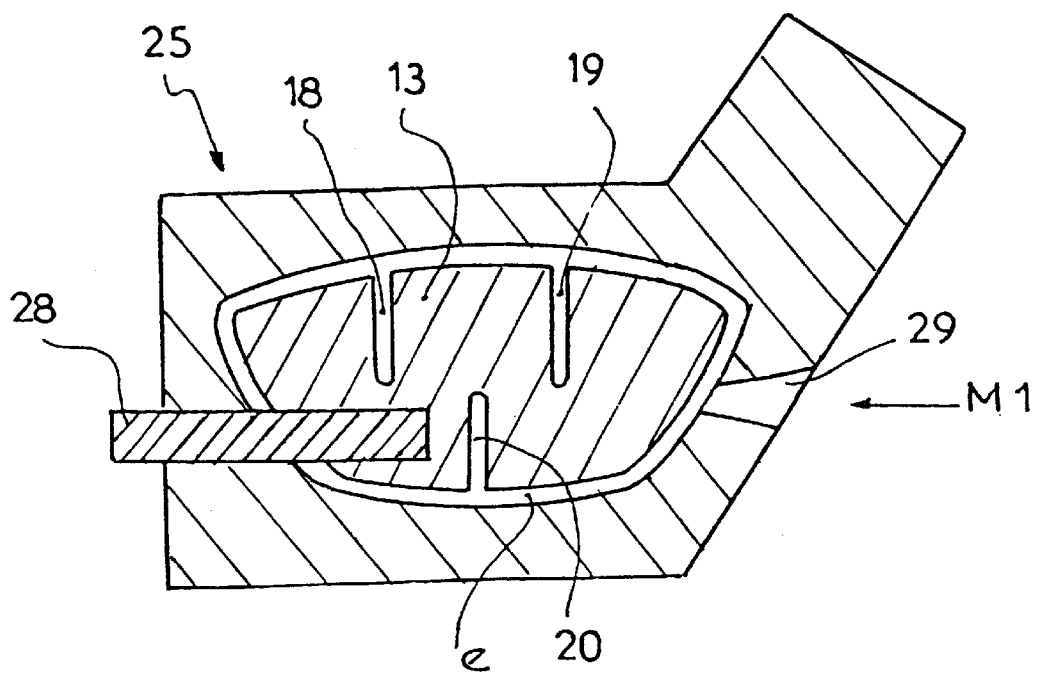

In a step prior to the injection of the shell (see FIGS. 12, 13), the resistance element 200 and the meltable core 13 with its weight 10 are placed in an injection mold 25. The retention of the resistance element 200 in the mold 25 is ensured by a retention shaft 26 engaged in hole 27 of neck 2, whereas the retention of the core 13 in the mold is ensured by a transverse member 28. Once the mold is ready with resistance element 200 and meltable core 13, the shell 3 is injected in a main step (see FIG. 14). The injected material M1 adapted to form the shell and to coat the core 13 and the resistance wall 9 is injected via injection hole 29. The injection material M1 thus enters the peripheral space e left free between the wall of the mold and the elements occupying the inside thereof, in other words, core 13 and resistance wall 9. In addition, the first material M1 enters into the space e1 left free between weight 10 and the walls of housing 21, and even enters into throat 24, thus ensuring the retention of the weight. As such, the weight is held by material M1 of the shell, and more particularly, by an extension 70 of the peripheral wall 7 (see FIG. 2). During injection, the injected material M1 also enters into the longitudinal recesses 18, 19 of the core, so as to form with the walls of the shell, reinforcement ribs. The meltable core 13 is made of a material M2 whose melting point is lower than the melting point of material M1 from which the shell is obtained. Preferably, it is a tin-alloy, lead, or bismuth based alloy. As an example, the composition by weight is as follows: AS (trace); Sn=15 to 20%; Bi=40 to 45%; Pb=remainder. The melting temperature of this alloy is less than 100° C. The injection temperature of material M1 when it is a polyamide of the reinforced "Zytel" type is approximately 280° C.

The front wall 8 of the shell is in contact with the resistance wall 9 and the peripheral edge 90 ensures a good connection between the shell and the resistance element 200.

Figure 15:
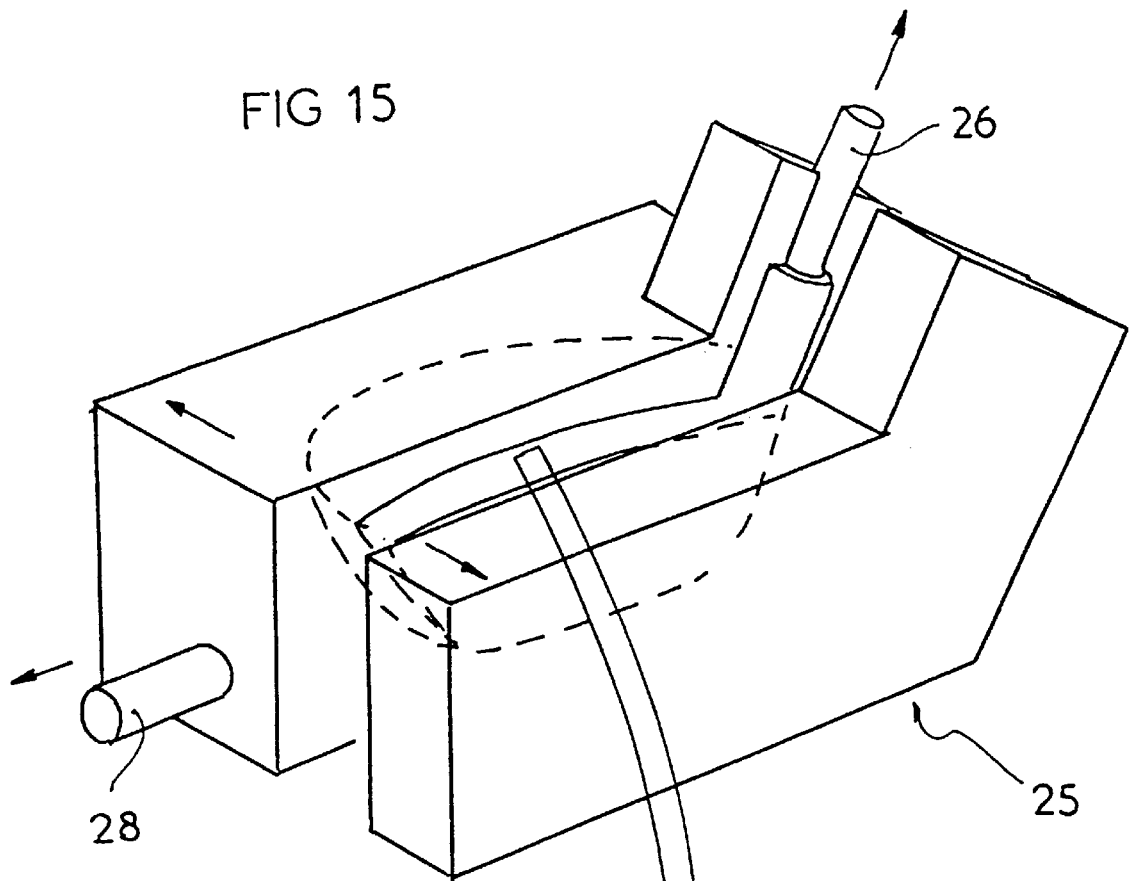
Figure 16:
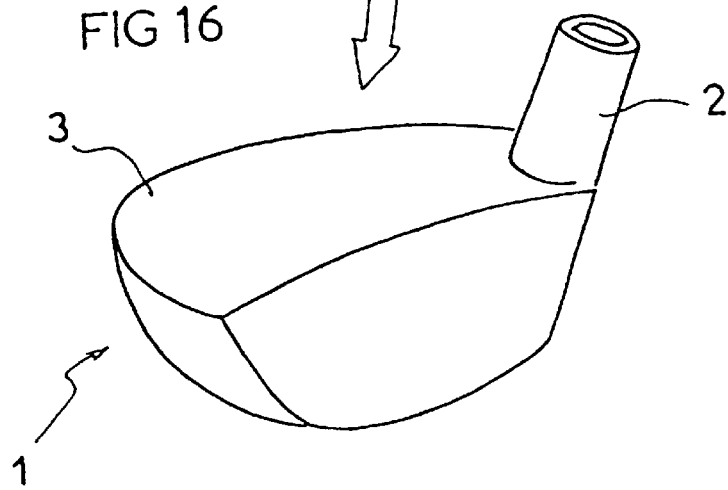

In a first complementary step, the mold 25 is opened (see FIG. 15) so as to extract therefrom the club head thus formed (FIG. 15), whereas in a second complementary step (see FIGS. 17, 18), the head is heated so as to obtain the melting of meltable core 13, and thus, by the elimination of the melted material, an inner cavity 11 is created.

In a third complementary step (see FIGS. 19, 20), a low density material M3 such as polyurethane foam, is poured into the inner cavity 11 to form the filling 12 of the cavity. The pouring is undertaken, for example, via hole 30 left by the transverse member 28 in the peripheral wall 7.

FIG. 21 is a perspective view of a first variation according to which the rear face of the resistance wall 9 comprises reinforcement ribs enabling the thickness of the wall to be reduced and to substantially lighten the element. It includes, for example, a peripheral rib 91 and two vertical ribs 92a, 92b.

FIGS. 22 and 23 represent a second variation according to which the lower rear portion of the resistance wall 9 comprises two protuberances extending in parallel towards the rear so as to at least partially project from the lower wall 6 of the shell 3.

Figure 24:
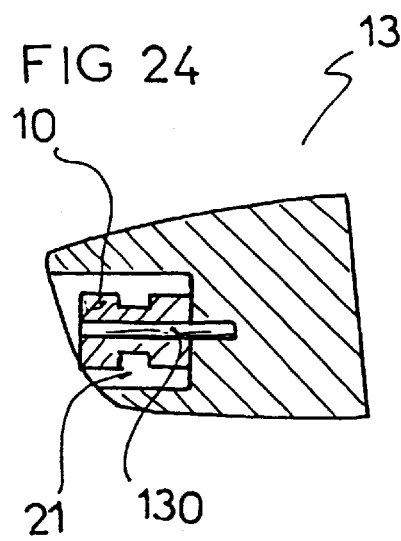
FIG. 24 is a view similar to FIG. 10, and shows a variation.

FIG. 24 is a view similar to FIG. 10, illustrating a variation according to which the weight 10 is rendered affixed to core 13 by virtue of a fixing pin or axle 130. In a variation of the method, the weight could be affixed to the meltable core during the molding thereof.

Figure 25:
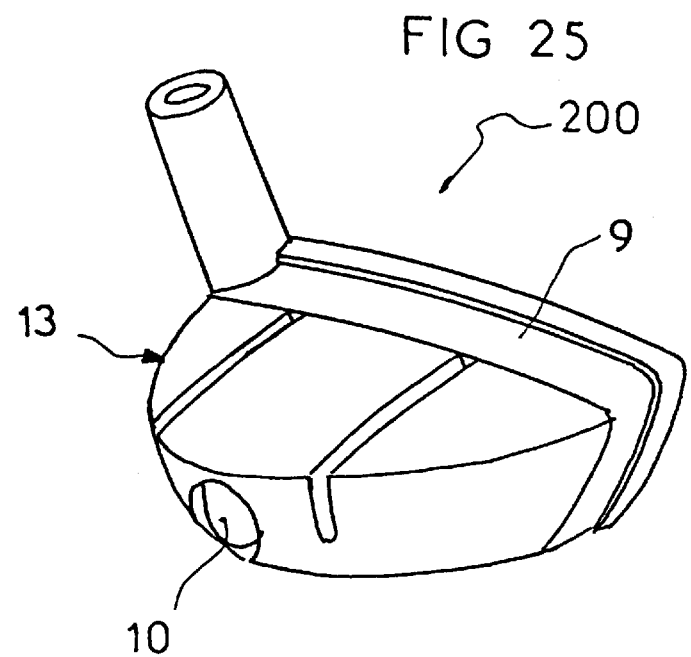
FIG. 25 is a rear perspective view showing another embodiment.

Before being placed in the mold 25, the core 13 with the weight 10 is affixed to the resistance wall 9 so as to constitute an integral sub-assembly, as is represented in FIG. 25. The affixation of the core 13 with the resistance element can be accomplished by any appropriate means and especially by nesting, adhesion, welding, or screwing.

Figure 26:
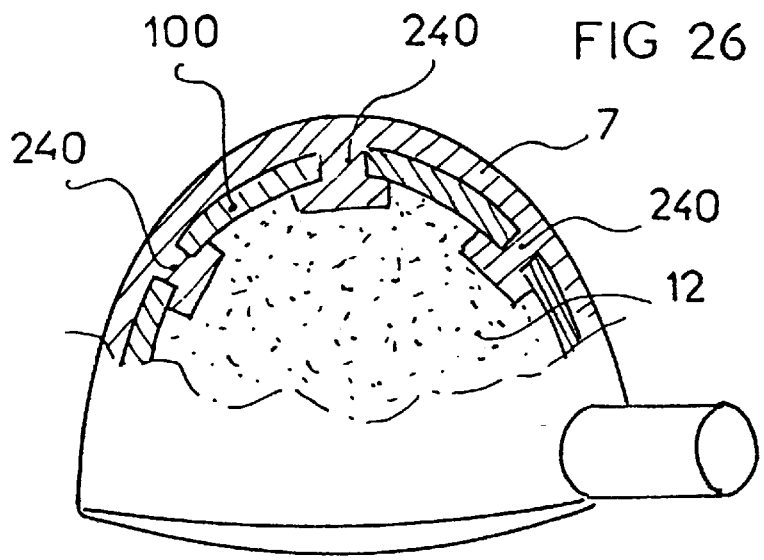
FIG. 26 represents another embodiment in a partial sectional top plan view.

The weight 10 can take any appropriate shape and any position without, however, exceeding the scope of the invention. FIG. 26 represents a variation in a partial sectional top view illustration. In this variation, the weight 10 is constituted by a peripheral metallic wall 100 comprising a succession of holes 240 enabling the injection material of the shell to penetrate inside it and to ensure the retention of the weight.

The invention is not limited to a golf club head of the "wood" type. More specifically, the head could be of any other type, and especially a head of the "iron" type, as is illustrated in FIG. 27. In order to facilitate an understanding of this illustration, those elements that are similar to the embodiment described previously bear the same reference numerals employed in the previous description.

The thickness e2 of the front wall 8 can vary and especially be reduced from the base (BA) upwards (HA) so that the striking surface 80 can be given the desired general inclination A. Thus, on the basis of one common resistance element 200, it would be possible to mold an entire series of heads whose striking surfaces have different inclinations. The thickness e2 can vary horizontally (see FIG. 2).

In a variation, it could be provided that the weight(s) be retained in one or more housings provided in the resistance wall. The weight(s) can also be fixed to the wall by other means, such as by screwing or adhesion.

Figure 28:
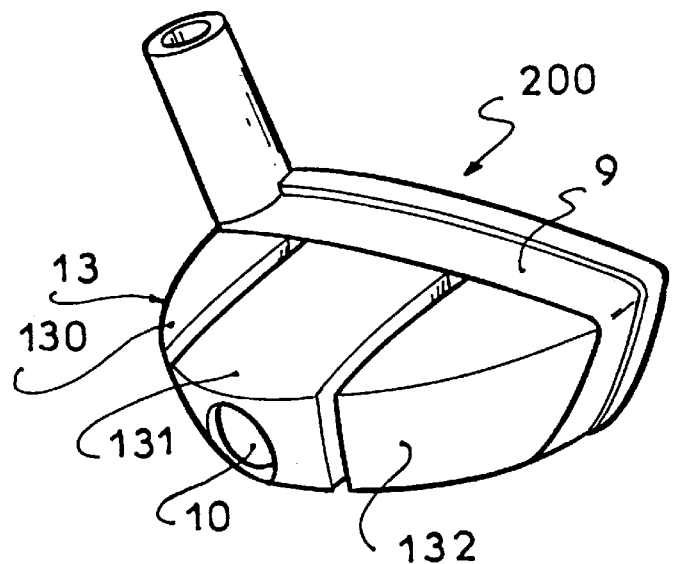
FIG. 28 is a view similar to FIG. 25 but according to a variation.

FIG. 28 represents a variation in which the starting meltable core is constituted of several separate parts 130, 131, 132.

As such, only some parts of the core can be eliminated after the injection operation. The other parts can act as weights, localized at pre-determined and advantageous positions.

Figure 29:
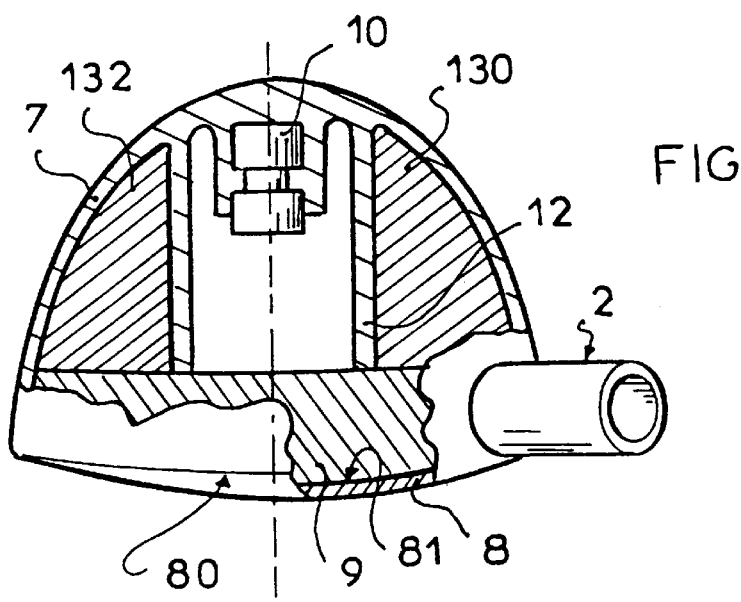
FIG. 29 is a top plan view in section according to a variation of FIG. 28.

FIG. 29 shows, for example, a head according to the invention whose central part was the only one to be eliminated. The two lateral parts 130, 132 act as weights in the context of a lateral distribution of the masses of the head, as is known.

The invention is not limited to the particular embodiments described and represented as examples herein, but also comprises all technical equivalents and combinations thereof.

What is claimed is:

1. A method of manufacturing a golf club head, said method comprising:

affixing at least one insert and a meltable core together to form an insert/core assembly, with at least a portion of said insert projecting from said meltable core, said meltable core having a first melting point;

immobilizing said insert/core assembly in a position in a mold to create a peripheral space between said insert/core assembly and interior walls of the mold;

injecting plastic material into said peripheral space to coat said insert/core assembly, thereby coating the entirety of said projecting portion of said insert and forming a peripheral shell of the golf club head constituted by a plurality of walls, wherein said forming a peripheral shell of the golf club head comprises forming an exterior coating over said insert, coated by said injecting of plastic material, to encase said insert within said peripheral shell, said plastic material having a second melting point, said first melting point of said meltable core being lower than said second melting point of said plastic material;

eliminating said meltable core to thereby create an inner cavity of said peripheral shell of the golf club head; and retaining said coated insert as a component of the golf club head manufactured by the method.

2. A method of manufacturing a golf club head according to claim 1, wherein:

at least a part of said projecting portion of said insert comprises a shoulder or a recess; and said coating said projecting portion of said insert further comprises forming means for retaining said insert by injecting said plastic material to engage said shoulder or recess of said insert.

3. A method of manufacturing a golf club head according to claim 1, wherein:

said plurality of walls of said peripheral shell of the golf club head includes a front wall forming a striking face of the golf club head;

said insert is a resistance element having a resistance wall affixed to a front face of said meltable core for reinforcing said front wall following said injecting of said plastic material.

4. A method of manufacturing a golf club head according to claim 3, wherein:

said resistance element further comprises a portion extending laterally of said resistance wall, said laterally extending portion at least partially forming a neck of the golf club head.

5. A method of manufacturing a golf club head according to claim 4, wherein:

said resistance wall is made of aluminum and said laterally extending portion is made of steel and said laterally extending portion is welded to said resistance wall.

6. A method of manufacturing a golf club head according to claim 4, wherein:

said resistance wall is made of aluminum and said laterally extending portion is made of steel and said laterally extending portion extends into said resistance wall.

7. A method of manufacturing a golf club head according to claim 1, wherein:

said insert is a weight affixed to a face of said meltable core before said injecting of said plastic material so that said projecting portion of said weight becomes affixed to one of said plurality of walls of said peripheral shell after said injecting of said plastic material.

8. A method of manufacturing a golf club head according to claim 1, wherein:

said meltable core comprises at least one housing, said weight being positioned in and retained by said housing, said housing having larger internal dimensions than said weight in some respective areas to thereby create a space between said weight and an inner surface of said housing; and said injecting of said plastic material causes said plastic material to enter said space between said weight and said inner surface of said housing.

9. A method of manufacturing a golf club head according to claim 7, wherein:

said weight comprises a material selected from the group consisting of brass, bronze, and steel.

10. The method of manufacturing a golf club head according to claim 7, wherein:

said forming a peripheral shell of the golf club head further comprises forming an exterior covering over said weight to encase said weight within said peripheral shell.

11. The method of manufacturing a golf club head according to claim 7, further comprising:

inserting within said inner cavity only a low density filler material.

12. A method of manufacturing a golf club head according to claim 1, further comprising:

filling said inner cavity with a low density filler material.

13. A method of manufacturing a golf club head according to claim 1, wherein:

said meltable core comprises an alloy, said alloy comprising a member selected from the group consisting of tin, lead, and bismuth.

14. A method of manufacturing a golf club head according to claim 1, wherein:

said peripheral shell comprises a material selected from the group consisting of polyamide, polypropylene, and acrylonitrilebutadienestyrene.

15. A method of manufacturing a golf club head according to claim 1, wherein:

said golf club head is a wood club head.

16. A method of manufacturing a golf club head according to claim 1, wherein:

said golf club head is an iron club head.

17. The method of manufacturing a golf club head according to claim 1, wherein:

said immobilizing said insert/core assembly in a position in a mold comprises positioning a retention member between said insert/core assembly and an interior portion of the mold.

18. The method of manufacturing a golf club head according to claim 1, wherein:

said immobilizing said insert/core assembly in a position in a mold comprises entirely containing said insert/core assembly within a space defined by the interior walls of the mold.

19. The method of manufacturing a golf club head according to claim 1, wherein:

said meltable core comprises a front face and other faces;

said insert is a weight affixed to one of said other faces of said meltable core before said injecting of said plastic material so that said projecting portion of said weight becomes affixed to one of said plurality of walls of said peripheral shell after said injecting of said plastic material;

said plurality of walls of said peripheral shell of the golf club head includes a front wall forming a striking face of the golf club head;

the method further comprises affixing a second insert to said meltable core, said second insert constituting a resistance element having a resistance wall affixed to said front face of said meltable core for reinforcing said front wall following said injecting of said plastic material.

20. The method of manufacturing a golf club head according to claim 1, wherein:

said affixing at least one insert and a meltable core together comprises affixing said at least one insert to said meltable core.

21. The method of manufacturing a golf club head according to claim 1, wherein:

said affixing at least one insert and a meltable core together comprises affixing said at least one insert and said meltable core together with a fixing pin.

22. The method of manufacturing a golf club head according to claim 1, wherein:

said affixing at least one insert and a meltable core together comprises affixing said insert to said meltable core during molding of said meltable core.

23. The method of manufacturing a golf club head according to claim 1, wherein:

said insert and said core are comprised of different materials.

24. The method of manufacturing a golf club head according to claim 1, wherein:

said insert and said core have different melting points.

25. A method of manufacturing a golf club head, said method comprising:

affixing at least one insert and a meltable core together to form an insert/core assembly, with at least a portion of said at least one insert projecting from said meltable core, said meltable core having a first melting point;

immobilizing and confining the entirety of said insert/core assembly in a mold to create a peripheral space between said insert/core assembly and interior walls of the mold, whereby said at least one insert is spaced from and does not contact the interior walls of the mold;

injecting plastic material into said peripheral space to coat said insert/core assembly, thereby coating at least a part of said projecting portion of said at least one insert and forming a peripheral shell of the golf club head constituted by a plurality of walls, said plastic material having a second melting point, said first melting point of said meltable core being lower than said second melting point of said plastic material; and eliminating said meltable core to thereby create an inner cavity of said peripheral shell of the golf club head.

26. The method of manufacturing a golf club head according to claim 25, further comprising:

retaining said at least one insert as a component of the golf club head manufactured by the method.

27. The method of manufacturing a golf club head according to claim 25, wherein:

said affixing at least one insert and a meltable core together comprises affixing said at least one insert to said meltable core.

28. The method of manufacturing a golf club head according to claim 25, wherein:

said affixing at least one insert and a meltable core together comprises affixing said at least one insert and said meltable core together with a fixing pin.

29. The method of manufacturing a golf club head according to claim 25, wherein:

said affixing at least one insert and a meltable core together comprises affixing said insert to said meltable core during molding of said meltable core.

30. The method of manufacturing a golf club head according to claim 25, wherein:

said insert and said core are comprised of different materials.

31. The method of manufacturing a golf club head according to claim 25, wherein:

said insert and said core have different melting points.

* * * * *

UNITED STATES PATENT AND TRADEMARK OFFICE
CERTIFICATE OF CORRECTION

PATENT NO. : 6,146,571
DATED : November 14, 2000
INVENTOR(S) : B. Vincent et al.

It is certified that error appears in the above-identified patent and that said Letters Patent is hereby corrected as shown below:

<u>Column 8,</u>
Line 43 of the printed patent, "claim 1" should be -- claim 7 --"

Signed and Sealed this

Thirty-first Day of July, 2001

Attest:

*Attesting Officer*

NICHOLAS P. GODICI
*Acting Director of the United States Patent and Trademark Office*